US012633560B2

(12) United States Patent
Ramkumar et al.

(10) Patent No.: US 12,633,560 B2
(45) Date of Patent: May 19, 2026

(54) ION-CONDUCTING MEMBRANES, COMPONENTS HAVING THE ION-CONDUCTING MEMBRANES, AND PROCESS FOR FORMING THE SAME

(71) Applicant: VIMANO INC., Philadelphia, PA (US)

(72) Inventors: Murari Ramkumar, Bangalore (IN); Nagesh Sanjeeva Kini, Bangalore (IN)

(73) Assignee: Vimano Inc., Philadelphia, PA (US)

( * ) Notice: Subject to any disclaimer, the term of this patent is extended or adjusted under 35 U.S.C. 154(b) by 531 days.

(21) Appl. No.: 17/794,199

(22) PCT Filed: May 26, 2021

(86) PCT No.: PCT/IN2021/050514
§ 371 (c)(1),
(2) Date: Jul. 20, 2022

(87) PCT Pub. No.: WO2021/240546
PCT Pub. Date: Dec. 2, 2021

(65) Prior Publication Data
US 2023/0072302 A1     Mar. 9, 2023

(30) Foreign Application Priority Data
May 26, 2020     (IN) ............................. 202041021955

(51) Int. Cl.
*H01M 8/1048*          (2016.01)
*C25B 9/23*          (2021.01)
(Continued)

(52) U.S. Cl.
CPC ............. *H01M 8/1048* (2013.01); *C25B 9/23* (2021.01); *H01M 6/181* (2013.01); *H01M 6/188* (2013.01);
(Continued)

(58) Field of Classification Search
CPC ............. H01M 8/1048; H01M 50/403; H01M 50/446; H01M 6/181; H01M 6/188;
(Continued)

(56) References Cited

U.S. PATENT DOCUMENTS

2010/0279201 A1     11/2010     Mofakhami
2017/0279122 A1      9/2017     Helms et al.
(Continued)

FOREIGN PATENT DOCUMENTS

CN          107256975 A     10/2017
CN          110571465    *  12/2019
(Continued)

OTHER PUBLICATIONS

CN110571465 English translation. Qu et al. China. Dec. 13, 2019. (Year: 2019).*
(Continued)

*Primary Examiner* — Christopher P Domone
(74) *Attorney, Agent, or Firm* — Bradley Arant Boult Cummings LLP; Daniel E. Sineway, Esq.

(57)          ABSTRACT

In this disclosure, an ion-conducting membrane, a component having the ion-conducting membrane and a process for making the membrane and the component are disclosed. The ion-conducting membrane includes a homogenous blend and one or more additives. The selected one or more polymers are present in a mass-percentage in a range from 1% to 40. The present ion-conducting membrane simultaneously increases the power and efficiency of the devices by combining advances in materials chemistry, nanotechnology, and manufacturing. The present ion-conducting membrane overcomes limitations in the currently known technologies without compromising the advantageous properties. The present membrane provides non-linear per-
(Continued)

formance enhancement in electrochemical devices that leads to overall system level cost reduction.

15 Claims, 3 Drawing Sheets

(51) Int. Cl.

| | |
|---|---|
| *H01M 6/18* | (2006.01) |
| *H01M 8/1007* | (2016.01) |
| *H01M 8/1011* | (2016.01) |
| *H01M 8/1081* | (2016.01) |
| *H01M 8/1086* | (2016.01) |
| *H01M 8/1233* | (2016.01) |
| *H01M 8/124* | (2016.01) |
| *H01M 8/18* | (2006.01) |
| *H01M 50/403* | (2021.01) |
| *H01M 50/446* | (2021.01) |
| *H01M 8/10* | (2016.01) |

(52) U.S. Cl.
CPC ....... *H01M 8/1007* (2016.02); *H01M 8/1011* (2013.01); *H01M 8/1081* (2013.01); *H01M 8/1086* (2013.01); *H01M 8/1233* (2013.01); *H01M 8/124* (2013.01); *H01M 8/188* (2013.01); *H01M 50/403* (2021.01); *H01M 50/446* (2021.01); *H01M 2008/1095* (2013.01)

(58) Field of Classification Search
CPC ............. H01M 8/1011; H01M 8/1016; H01M 8/1018; H01M 8/1081; H01M 8/1086; H01M 8/1233; H01M 8/124; H01M 8/188; H01M 2008/1095; C25B 9/23
See application file for complete search history.

(56) References Cited

U.S. PATENT DOCUMENTS

| | | | | |
|---|---|---|---|---|
| 2017/0365883 A1* | 12/2017 | Luski | .............. | H01M 10/0567 |
| 2020/0358119 A1* | 11/2020 | Tago | ...................... | C08L 79/04 |
| 2023/0183090 A1* | 6/2023 | Tao | ...................... | C01G 25/006 |
| | | | | 429/409 |

FOREIGN PATENT DOCUMENTS

| | | |
|---|---|---|
| JP | 2015111531 A | 6/2015 |
| JP | 2015529936 A | 10/2015 |
| JP | 2015219941 A | 12/2015 |
| WO | 2018207325 | 11/2018 |

OTHER PUBLICATIONS

Notice of Reasons for Refusal, issued in Japanese Patent Application No. 2022-573283, dated Dec. 15, 2023.

Cali A., et al., "Highly Durable Phosphonated Graphene Oxide Doped Polyvinylidene Fluoride (PVDF) Composite Membranes," International Journal of Hydrogen Energy, Elsevier Science Publishers B.V., Barking, GB, Feb. 7, 2020, vol. 45, No. 60, pp. 35171-35179, DOI: 10.1016/J.IJHYDENE.2020.01.092, ISSN 0360-3199, XP086370058.

Choi S-W., et al., "Hydrocarbon Membranes (10) with High Selectivity and Enhanced Stability for Vanadium Redox Flow Battery Applications: Comparative Study with Sulfonated Poly(Ether Sulfone)s and Sulfonated Poly(Thioether Ether Sulfone)s," Electrochimica Acta, 2018, vol. 259, pp. 427-439.

International Preliminary Report on Patentability for International Application No. PCT/IN2021/050514, mailed Dec. 8, 2022, 8 Pages.

International Search Report and Written Opinion for International Application No. PCT/IN2021/050514, mailed Sep. 20, 2021, 11 Pages.

Pokhrel S., et al., "Functionalization of Chitosan Polymer and their Applications," Journal of Macromolecular Science, 2019, vol. 56, pp. 450-475.

Raja M., et al., "Binder-Free Thin Graphite Fiber Mat Sandwich Electrode Architectures for Energy-Efficient Vanadium Redox Flow Batteries," Catalysis Today, 2021, vol. 370, pp. 181-188, DOI:10.1016/j.cattod.2021.02.012, XP086572206.

Rajesh K., et al., "Synergistic Role of Graphene Oxide-Magnetite Nanofillers Contribution on Ionic Conductivity and Permeability for Polybenzimidazole Membrane Electrolytes," Journal of Power Sources, Elsevier SA, CH, Jan. 28, 2019, vol. 445, DOI:10.1016/J.JPOWSOUR.2019.227293, ISSN 0378-7753, XP085938576.

Singha S., et al., "Effect of Composition on the Properties of PEM based on Polybenzimidazole and Poly(Vinylidene Fluoride) Blends," Polymer, Elsevier Science Publishers B.V, GB, Dec. 19, 2013, vol. 55, No. 2, pp. 594-601, DOI:10.1016/J.POLYMER.2013.12.021, ISSN 0032-3861, XP028817700.

Tyson B. M., et al., "A Quantitative Method for Analyzing the Dispersion and Agglomeration of Nano-Particles in Composite Materials," Composites, 2011, vol. 42, pp. 1395-1403.

Yan F., et al., "A Selective Electrocatalyst-Based Direct Methanol Fuel Cell Operated at High Concentrations of Methanol," Science Advances, 2017, vol. 3, pp. 1-7.

* cited by examiner

100

100

ION-CONDUCTING MEMBRANES, COMPONENTS HAVING THE ION-CONDUCTING MEMBRANES, AND PROCESS FOR FORMING THE SAME

CROSS-REFERENCE TO RELATED APPLICATIONS

This application is a national phase entry of, and claims the benefit of and priority to International Patent Application No. PCT/IN2021/050514, filed May 26, 2021, entitled "ION-CONDUCTING MEMBRANES, COMPONENTS HAVING THE ION-CONDUCTING MEMBRANES, AND PROCESS FOR FORMING THE SAME," which claims priority to Indian Application No. 202041021955, filed May 26, 2020, and entitled "ION-CONDUCTING MEMBRANES, COMPONENTS HAVING THE ION-CONDUCTING MEMBRANES, AND PROCESS FOR FORMING THE SAME," all of which are incorporated by reference in their entireties herein.

FIELD OF INVENTION

The present disclosure relates to ion-conducting membranes. Specifically, the disclosure relates to ion-conducting membranes, components having ion-conducting membranes as one of their parts, process for forming ion-conducting membranes and the components.

BACKGROUND OF THE INVENTION

Ion-conducting membranes are solid materials that allow transport of ions through them. Ion-conducting membranes are used in devices used for applications such as energy-generation, energy-conversion, and energy-storage. Ion-conducting membranes are also electrical insulators. Ion-conducting membranes determine power (the rate of extracting energy) and efficiency of the energy devices. Ion-conducting membranes are unlike separators that allow bulk transport of flammable organic liquids through micropores. The stability of the ion-conducting membrane determines the operational window of the device.

Ion-conducting membranes may be effectively used in energy generation, conversion, and storage. Fuel-cells are energy conversion devices which convert a fuel into electricity. Electrolysers function in a way opposite to fuel-cells in that they generate a fuel (such as $H_2$) when supplied with electricity. Batteries store energy. For a given energy-density, the power density of a battery is fixed and vice versa. Flow-batteries combine features of both a battery and fuel-cell into a single device. Like in a fuel-cell, where the fuel is stored separate from the stack, in a flow-battery, the energy is stored in separate tanks in chemical form and flown in to stack that converts this chemical energy to electrical energy. An efficient ion-conducting membrane may enhance the performance of the device and extend its use.

Initially developed ion-conducting membranes were used in low-temperature polymer-electrolyte-membrane (LT-PEM) fuel-cells, which are also known as proton-exchange-membrane (PEM) fuel cells. Nafion™ developed by Dupont in 1970 has been the industry standard due to its excellent chemical stability and ion-conductivity under humidified conditions. However, Nafion™ can only conduct positive ions, and has poor selectivity among positive ions and needs a water management system. Also, it can operate only below 120° C. thereby limiting the types of devices in which it can be used. Use of Nafion™ is also limited by its cost. Ion-conducting membranes containing polybenzimidazole (PBI) were developed to operate in anhydrous conditions. PBI-based ion-conducting membranes conduct ions through trapping protons ($H^+$) along their polymeric chain backbone through acid doping. Increasing the ionic-conductivity of PBI-based membranes sacrifices its strength. Crosslinking increases the membrane's strength, but often leads to a trade-off in other properties. Crosslinking generally comes at the expense of the protonated amide linkage of PBI being linked to another polymer, thereby rendering the site inaccessible to proton-hopping but with increased strength. Since conductivity, selectivity and strength are orthogonal properties in the current material systems, an increase in one property is offset by a decrease in an associated property.

Ion-conductors for metal-batteries (lithium-air, lithium-sulphur, aluminum-air, zinc-air etc.) generally use ceramic electrolytes. The anode and cathode side pose differing challenges in the construction of such devices. Often, presence and growth of dendrites and instability of the electrode with electrolytes, and crossover of active material degrades the performance of such batteries. The metal-anode, say lithium, is joined or deposited through certain technique with the ceramic electrolyte. Dendrites grow from the surface of the metal-anode through the electrolyte. Multiple dendrites can grow and propagate through the bulk of the electrolyte. The cathode side uses electrodes of different properties compared to the anode. Further, the interface between the cathode and anode needs to be engineered to selectively allow desirable ions. Advanced metal-batteries and advanced solid-state-batteries are a sub-category of these type of batteries, which use solid-state ion-conductors like above, and, in some cases, Nafion™. These place limitations on the power that can be extracted from these battery systems.

Electrolytes of flow-batteries often utilize multivalent catholytes and anolytes. Hence use of an ion-conducting membrane that can selectively transport only particular type of cations or anions is beneficial in the flow-batteries. Such membranes should have two critical performance parameters: high ionic-conductivity and high ionic-selectivity for the dominant ions contributing to the function.

First generation separators also called nonzero gap separators are physical separators using diaphragms. Such porous separators suffer from severe crossover, thereby limiting the operational window of the device. Second generation of membranes was based on perfluoro-sulphonic-acid (PFSA). PFSA-based membranes sacrifice selectivity due to Donnan membrane equilibrium. The equilibrium which is derived from the second law of thermodynamics, dealing solely with completely ionized electrolytes across a permeable barrier. The construction of PFSA-based membranes which have a Teflon™-like hydrophobic backbone and ionogenic group $SO_3^-$, leads to conditions of the Donnan equilibrium. When the equilibrium is reached, all positive ions diffuse out from one phase (or region) to the other in systems involving water or polar solvents. In the presence of multi cation systems such as flow batteries, we are limited by the maximal current density that can be drawn, as an increase in the charging/discharging rates under dynamic conditions leads the counter positive ion also to pass through the membrane. This leads to permanent capacity fade of the batteries.

To mitigate some of the limitations of low-temperature proton-exchange-membrane fuel-cell (LT-PEM) systems, high-temperature proton-exchange-membrane (HT-PEM) based on anhydrous conduction of protons were developed.

Thus, there is a need for an ion-conducting membrane capable of retaining its conductivity at higher temperatures without compromising on selectivity or its mechanical resilience. Generation-2 membranes were built around PBI, with enhanced proton-conductivity achieved by impregnating PBI with phosphoric acid. The drawback of such phosphoric acid based PBI is that it requires high levels of acid content for high conductivities which in turn result in deterioration of mechanical properties. Some of the techniques used in the prior art involve crosslinking, post processing, functionalising PBI, and using additives such as graphene-oxide (GO). However. GO gets reduced above 160° C. to reduced graphene-oxide (r-GO), which in turn is electronic conducting. This leads to a loss of conductivity and limits the loading amount of graphene-oxide within the system. If there is a percolated network, it can short the system. Stacking of multi-layered graphene prohibits through-plane proton-transport.

In case of direct-methanol fuel-cells (DMFC), the Generation-2 membranes limit the concentration of methanol that is used as fuel-input, due to crossover of methanol. The DMFCs are limited by using 1 molar to 3 molar concentration of methanol as fuel-feed. Such low concentration requires a high degree of dilution with water. A value, cost, versus performance analysis shows that methanol concentration greater than 10 M is required for it to be competitive with other competitive technologies such as diesel generators. Feng, Yan, et. al., "A selective electrocatalyst-based direct methanol fuel cell operated at high concentrations of methanol.", Science Advances vol. 3, pp 1-7 (2017).

First generation and second generation anion-conductors suffer from some common drawbacks, such as figure-of-merit tradeoff between anionic conductance and mechanical properties. And since anions (OH⁻) tend to be larger compared to protons, the tradeoff premium remains high. A common way to introduce anionic charge carriers or ionomer-groups involves quaternising the polymeric backbone with quaternary ammonium functionalising groups. While operating in strong alkali media such as potassium hydroxide or sodium hydroxide, the interaction between the strong base and the anionic ionogenic group attached to the polymer chain leads to chemical-induced mechanical degradation. This mechanism is known as Hoffman degradation. A common prior-art goal is to get conductive membranes which are mechanically strong and have stable retention of anionic conductance over a wide variety of temperatures.

Currently known membranes have technical limitations on how the individual devices can be operated and also currently there are no membranes that simultaneously solve the limitations and fit across the various device categories of interest. The orthogonal property requirement of selectivity, conductivity, and strength places a restriction on device operating conditions. Primarily these types of membranes are polymer-chemistry driven with specific application and restricted operating conditions. The presently disclosed membrane, composition and process for making the same, provide enhanced strength, selectivity, and conductivity over known membranes in various applications, including high-temperature and other difficult operating conditions.

BRIEF DESCRIPTION

This summary is provided to introduce a selection of concepts in a simple manner that is further described in the detailed description of the disclosure. This summary is not intended to identify key or essential inventive concepts of the subject matter nor is it intended for determining the scope of the disclosure.

The present disclosure is directed to ion-conducting membrane made up of a homogenous blend of polybenzimidazole (PBI) with one or more of the polymers selected from the group consisting of polyvinylidene difluoride (PVDF), Poly(vinylidene fluoride-co-hexafluoropropylene) PVDF-HFP, chitosan, and functionalized-chitosan. The one or more additives are selected from the group consisting of graphene-oxide (GO), functionalized graphene-oxide (functionalized-GO), and hexagonal boron nitride (h-BN). The selected one or more polymers are present in a mass-percentage in a range from 1% to 40%, while the mass percentage of the selected additives is in a range from 0.5% to 80%. The additives are dispersed in the homogenous blend with a dispersion quantity of greater than 80% and agglomeration quantity less than 30%. The ion-conducting membrane can have an area-specific ion-conductance greater than 1 S/cm² at 30° C.

Also taught herein is a component including an ion-conducting membrane including a homogenous blend of PBI with one or more of the polymers selected from the group consisting of PVDF, PVDF-HFP, chitosan, and functionalised-chitosan with a mass-percentage of the one or more polymers in a range from 1% to 40%. The ion-conducting membrane of the component has one or more additives selected from the group consisting of graphene-oxide, functionalised graphene-oxide, and h-BN, where a mass percentage of the one or more additives is in a range from 0.5% to 80%. The additives are dispersed in the homogeneous blend with a dispersion quantity of greater than 80%, an agglomeration quantity less than 30%, and the area-specific ion-conductance of the membrane is greater than 1 S/cm² at 30° C.

The process for making an ion-conducting membrane according to the present teachings includes dissolving a PBI polymer and one or more polymers selected from the group consisting of PVDF, PVDF-HFP, chitosan, and functionalised-chitosan in one or more solvents selected from the group consisting of N,N-Dimethylacetamide (DMAc), N,N-Dimethylformamide (DMF), Dimethyl sulfoxide (DMSO), N-Methyl-2-pyrrolidone (NMP), tetrahydrofuran (THF), phosphoric acid, poly-phosphoric acid, formic acid, KOH, and ethanol. This step forms a homogeneous polymer-solution with a mass percentage of the selected one or more polymers in a range from 1% to 40%. One or more additives selected from the group consisting of graphene-oxide, functionalised graphene-oxide, and hexagonal boron nitride (h-BN) are dispersed in one or more solvents selected from the group consisting of DMAc, DMF, DMSO, NMP, THF phosphoric acid, poly-phosphoric acid, formic acid, KOH, and ethanol to form an additive-dispersion with the mass percentage of the one or more additives in a range from 0.5% to 80%. Then the polymer-solution and the additive-dispersion are homogeneously mixed to obtain a pre-forming solution. A sheet is formed from the pre-forming solution and the solvent is removed to obtain the ion-conducting membrane with an area-specific ion-conductance greater than 1 S/cm² at 30° C., and the additives are dispersed with a dispersion quantity of greater than 80%, an agglomeration quantity less than 30%.

To further clarify advantages and features of the present disclosure, a more particular description of the disclosure will be rendered by reference to specific embodiments thereof, which are illustrated in the appended figures. It is to be appreciated that these figures depict only typical embodiments of the disclosure and are therefore not to be considered limiting of its scope. The disclosure will be described and explained with additional specificity and detail with the accompanying figures.

BRIEF DESCRIPTION OF THE FIGURES

These and other features, aspects, and advantages of the exemplary embodiments can be better understood when the following detailed description is read with reference to the accompanying drawings in which like characters represent like parts throughout the drawings, wherein.

In the figures, features of the figures are numbered to identify them. The features are identified as follows: 10 membrane; 12 polymer blend; 14 one or more additives; 20 nanofiber mat; 22 nanofibers; 30 substrate/electrode/electrolyte, and 100 component.

Further, skilled artisans will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily 35 apparent to those of ordinary skill in the art having the benefit of the description herein.

DETAILED DESCRIPTION

In this disclosure, an ion-conducting membrane (10), a component (100) having the ion-conducting membrane (10) and a process for making the membrane (10) and the component (100) are disclosed. An ion-conducting membrane (10) conducts charged chemical species of different types including positive ions, which may be cations, more specifically protons (H$^+$) and transition metal ions, negatively charged particles including hydroxyl (OH$^-$) ions.

An ion-conducting membrane (10) may be used in electrochemical devices including a flow-battery, fuel-cell, electrolyser and advanced metal-battery. The membranes (10) disclosed herein have advantageous properties when deployed at least in one of the electrochemical devices listed above.

Figure 1:
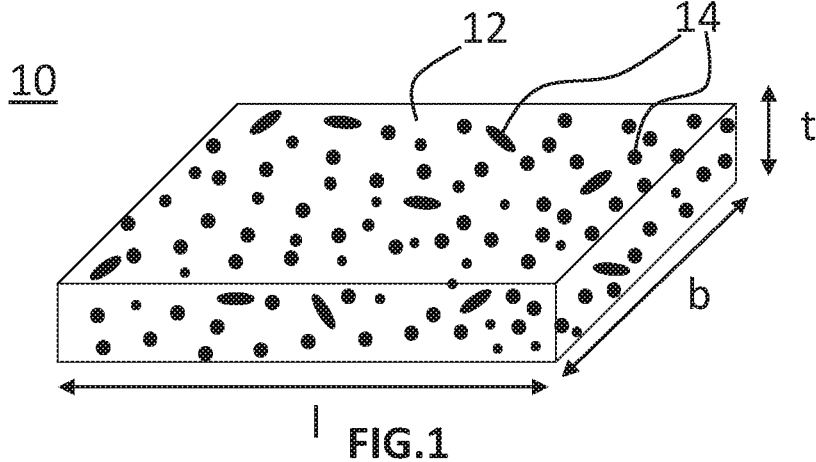
FIG. 1 illustrates a membrane (10) with additives (14) of different dimensions (ranging from nano to meso scales), different shapes and size-distributions, in accordance with one embodiment of the present disclosure.

FIG. 1 shows an ion-conducting membrane (10). The disclosed ion-conducting membrane (10) includes a homogeneous blend (12) of two or more polymers with one or more additives (14) dispersed throughout. Herein a "homogeneous blend" means a solid material in which the ingredients are mixed at the molecular level and the ingredients are not distinguishable through physical appearance at length-scales larger than molecular dimensions. PBI is one of the polymers of the homogeneous blend (12).

Polybenzimidazole (PBI) contains benzimidazole repeat units. A typical chemical name of a PBI polymer is "poly [2,2'-(m-phenylene)-5,5'-bibenzimidazole]", which is commonly known as meta-PBI. Other known PBIs are para-PBI, PBI-OO, O-PBI, and AB-PBI. For the purpose of this disclosure, PBI refers to all the above different types of PBIs.

PBI has excellent mechanical properties and thermo-chemical stability. It has a high glass-transition temperature $T_g$, of 430° C. Its melting point is also very high, i.e., greater than 600° C. The cost of PBI is about two orders of magnitude lower in comparison with Nafion™.

The homogeneous blend (12) includes one or more other polymers, in addition to PBI. The one or more other polymers may include Poly(vinylidene fluoride) (PVDF), poly (vinylidene fluoride)-co-hexafluoropropylene (PVDF-HFP), chitosan, functionalized-chitosan, or any combinations of these 35 polymers. Herein, chitosan is a linear polysaccharide composed of randomly distributed β-(1→4)-linked D-glucosamine (deacetylated unit) and N-acetyl-D-glucosamine (acetylated unit). Further, herein chitosan and functionalized-chitosan may be as described in Shanta Pokhrel et. al., "Functionalization of chitosan polymer and their applications", Journal of Macromolecular Science, Part A Pure and Applied Chemistry, vol. 56, pp 450-475 (2019).

In the homogenous blend (12), the polymers are present in certain ratios. A mass percentage of one or more of the polymers in the homogeneous blend (12) is in a range from 1% to 40%. In some embodiments, the mass percentage of the various polymers can vary to any percentage that is in the range between 1% to 40%. Herein the "mass percentage" of an ingredient means the mass of the ingredient as a percentage of mass of PBI. More specifically, the "mass percentage" of an ingredient is calculated by dividing the mass of the ingredient by the mass of PBI and multiplying the same by 100. Herein the mass percentage of an ingredient, $m_f$, is defined as $$m_f = 100 \times \frac{\text{mass of ingredient}}{\text{mass of } PBI}$$

For example, in the homogeneous blend (12), the one or more polymers is present in a range from 1% to 40% of PBI.

Apart from the polymers, the ion-conducting membrane (10) includes one or more additives (14). Herein, the "additive (14)" means, any ingredient that is a part of the membrane (10) and the same is mixed with the homogeneous blend (12) and distinguishable through physical appearance at length scales larger than molecular dimensions. In various embodiments of the presently disclosed membrane (10) formulations, the mass percentage of the one or more additives (14) can vary to any percentage that is in the range of from 0.5% to 80%.

The one or more additives (14) include graphene-oxide (GO), functionalized graphene-oxide (functionalized-GO), hexagonal boron nitride (h-BN), or any combinations of these. The functional groups of GO may include one or more of $OH^-$, $NH^-_2$, $COOH^-$ groups. The mass percentage of the additives (14) is in a range from 0.5% to 80%. In some embodiments, the mass of additives (14) may be more than the mass of PBI. In such cases, the main ingredient of the membrane (10) will be the additive (14) and the polymer blend (12) will act as a supporting mass.

The advantageous properties of the disclosed membrane (10) are a result of the additives (14) added, the proportion of the additives (14), and the membrane (10)-forming process, all of which act synergistically to facilitate the passage of desirable ions through the membrane (10) and to prevent the passage of undesirable chemical species.

One objective of this disclosure is to increase the number of active pathways for desirable ions by reducing the energy-barrier for ion transfer and allowing more degrees of freedom for movement. The ion-conducting membrane (10) has an internal structure resembling a randomly distributed fractal network of nanoscale additives (14) in a polymer matrix. The interplay and access of nano scale morphologies and ion channels created by specific processing techniques disclosed herein leads to nonlinear increase in power and energy efficiencies of the electrochemical device having the ion-conducting membrane (10).

Another objective of this disclosure is to use additives (14) that aid in increasing the area-specific conductance, reducing permeability of undesirable chemical species such as, for example, vanadium ions as in the case of vanadium redox flow battery or methanol molecules as in the case of direct-methanol fuel-cells. The additives (14) serve as nano-scale reinforcement. The additives (14) may increase mechanical stability, thermal stability, electrochemical stability. The interaction energy between the polymers of the blend (12) and the additives (14) along with the processing parameters dictates a non-agglomerated dispersion and hence result in high dispersion quantity and low agglomeration quantity. Dimensions of some of the additives (14) may be in nanometer scale. In some embodiments, the dimensions of at least one of the additives (14) is in a range from 1 nm to 1000 nm.

The extent of dispersion, as measured by the dispersion-quantity and agglomeration as measured by the agglomeration-quantity, contribute to achieve the advantageous properties. The dispersion and agglomeration quantities of the additives (14) present in the membrane (10) are measured as set forth in Tyson, B. M., et al. "A quantitative method for analyzing the dispersion and agglomeration of nano-particles in composite materials," Composites: Part B, vol. 42. pp. 1395-1403 (2011).

For best results, dispersion-quantity of the one or more additives (14) has to be as high as possible (ideally, close to 100%) and agglomeration-quantity has to be as low as possible (ideally close to 0%). A dispersion quantity of the ion-conducting membrane (10) is greater than 80% and an agglomeration-quantity less than 30%. In some embodiments, the ion-conducting membrane (10) has a dispersion quantity greater than 85% and agglomeration quantity less than 15%.

Typically, an important performance parameter of a membrane (10) used in an electrochemical device is its ion-conductivity. The performance of an electrochemical device is measured by current-density which is determined mainly by its area-specific conductance measured in the units of $S/cm^2$. The membranes (10) described in this disclosure have an area-specific conductance greater than 1 $S/cm^2$ when measured at 30° C. The area-specific conductance is the ion-conductivity of a unit area of the membrane (10). In some embodiments the area-specific conductance of the ion-conducting membrane (10) is greater than 1 $S/cm^2$ under operating conditions. For example, in membranes (10) formed for use in HT-PEM fuel-cells, the area-specific conductance may be as high as 50 $S/cm^2$ in a temperature range from 160° C. to 200° C.

For any electrochemical application, the stability of the membrane (10) over long period of operation is very important. The membranes (10) described herein are stable over a period of at least 2000 hours or 2000 cycles, as the case may be, under respective operating conditions.

Another embodiment of the present disclosure is a process for forming an ion-conducting membrane (10). The process includes the steps of preparing a pre-formed solution, forming the membrane (10) on a substrate, and removing solvent. In some embodiments, where the membrane (10) is formed on a substrate other than that used for the end application, the process may further include the step of separating the membrane (10) from the substrate.

The pre-formed solution is formed by combining at least two parts. A first part is a homogeneous solution obtained by mixing the two or more polymers in a solvent. A second part is an additive (14) dispersion having dispersion of additives (14) in a solvent. The solvent used herein may be an organic solvent or a combination of one or more solvents. The one or more solvents may be selected from the group consisting of DMAc, DMF, DMSO, NMP, THF, phosphoric acid, poly-phosphoric acid, formic acid, KOH, and ethanol. The solvent used for the first part and the second part may be same or different. In some embodiments, the same solvent is used for both the parts. In some embodiments, a combination of two or more solvents may be used.

PBI is an important part of the homogeneous solution of polymers. The polymers constituting the first part, along with PBI may be one or more polymers selected from the group consisting of PVDF, PVDF-HFP, chitosan, functionalised-chitosan. The mass percentage of the selected one or more polymers is in a range from 1% to 40%. The mass ratios of the polymers to solvent are adjusted to obtain the desired viscosity in the final pre-formed solution. The mass fraction of polymers in the final polymer-solution is less than 0.2.

In some embodiments, a small amount of lithium chloride (LiCl) is added to facilitate dissolution of polymers. The mass percentage of LiCl is not greater than 10%. The LiCl added at this stage is finally removed from the membrane (10) in the solvent removal step.

The second part, or the additive (14) dispersion can comprise one or more of the additives (14) selected from the group consisting of GO, functionalised-GO, and h-BN. The solvent can be one or more of the solvents selected from the group consisting DMAc, DMF, DMSO, NMP, THF, phosphoric acid, poly-phosphoric acid, formic acid, KOH, and ethanol. A mass percentage of the one or more additives (14) is in the range from 0.5% to 80%. The mass ratios of the additives (14) to solvent are adjusted to obtain the desired viscosity in the final pre-formed solution.

The homogeneous solution of polymers is prepared by dissolving the selected polymers in the solvent by stirring and heating. The temperatures of dissolution vary in a range from 30° C. to 250° C. Heating process may involve several steps of ramping at different rates and soaking at several set temperatures over different periods of time.

In some embodiments, an autoclave, equipped with a mechanical stirrer, is used to dissolve the polymers in the solution. The various dissolution parameters such as the mass ratios of the polymers to solvent, the total volume of the mixture of polymers and solvents, the stirring speed, the maximum temperature and pressure of the mixture in the autoclave are selected to obtain a homogenous solution. The maximum temperature of the mixture inside the autoclave may not exceed 230° C. at a pressure of not greater than 3 bar.

The dispersion of the additives (14) in the solvent is prepared by alternatively stirring and mechanically sonicating the one or more additives (14) and solvent. The stirring speed, stirring duration and the duration of sonication are selected to obtain the required dispersion.

In the next step, the additive (14) dispersion is mixed with the homogenous polymer solution to form a pre-forming solution. A good mixing is achieved by alternatively stirring and sonicating the pre-forming solution. The stirring speed, stirring duration, and the duration of sonication are chosen to obtain the pre-formed solution of desired viscosity. The viscosity of the pre-formed solution is in a range from 20 centipoise to 3000 centipoise.

A membrane (10) is formed by casting the pre-formed solution on a suitable substrate with a doctor-blade. The gap between the edge of the doctor-blade and the surface of the substrate on which the membrane (10) is casted is adjusted to form the membrane (10) of the desired thickness. The speed of casting is adjusted to form a monolithic membrane (10) without any pin-holes. Once the preformed solution is cast by the doctor blade, it forms a sheet. This sheet is then heated in a hood equipped with electric-heaters or infrared-heaters to form the membrane (10) by uniformly driving out the solvent. The rate of ramping the temperature, the maximum temperature, and duration of soaking the membrane (10) at a set temperature are tailored to form a membrane (10) without any residual solvent or defects. The maximum temperature of heating is in a range from 30° C. to 250° C. In some embodiments, as-cast membrane (10) was heated in a hot-air oven to drive away the solvents. The ramp-soak sequences of heating are selected to drive away all the solvent.

After the heat-treatment, the membrane (10) is separated from the substrate. The separation may be achieved by using different liquids such as water, iso-propyl alcohol, methanol, ethanol, dilute inorganic acids or a mixture thereof.

In some embodiments, the membrane (10) is formed by spraying the pre-formed solution on an appropriate substrate. The viscosity of the pre-formed solution is in a range from 20 centipoise to 3000 centipoise. The membrane (10) is subsequently heated to a temperature in a range from 30° C. to 250° C. to remove solvent.

In some embodiments, the membrane (10) is also formed by electrospinning the pre-formed solution on to an appropriate substrate. The viscosity of the pre-formed solution is in a range from 20 centipoise to 3000 centipoise. The formed fibers are then post processed.

In some embodiments, the membrane (10) has a dispersion quantity greater than 80% and agglomeration quantity less than 20%, and an area-specific ion-conductance of the membrane (10) is greater than 1 S/cm² at 30° C.

The ion-conducting membrane (10) can be tuned to be suitable for application in multiple manufactured articles such as various devices and systems. Devices which are manufactured using such membranes (10) include a battery, a metal-air battery, a redox flow-battery, fuel-cell, a high-temperature proton-exchange-membrane (10) (HT-PEM) fuel-cell, an electrolyser, different types of electrolyzers, a direct-vapor fuel-cell, a direct-methanol fuel-cell (DMFC), a high-temperature direct-vapor fuel-cell, a high-temperature direct-methanol fuel-cell (HT-DMFC), a metal alkaline-earth battery, ammonia-generators, and lithium-ion extraction reactors.

In some embodiments, the ion-conducting membrane (10) may be used in a flow-battery. The ion-conducting membrane (10) used in such applications has an objective of having a high ion-conductivity for the desired ions, more specifically the protons, and low permeability for any undesirable chemical species. For example, in an all-vanadium redox flow battery, $V^{2+}$, $V^{3+}$, $V^{4+}$ and $V^{5+}$ are the chemical species that take part in the chemical reactions. While the membrane (10) is desired to have high conductivity for protons ($H^+$), the membrane (10) is also desired to prevent cross-over of vanadium-ions listed above through the membrane (10).

Another important performance parameter of the ion-conducting membrane (10) in a flow battery is the area-specific conductance of the membrane (10), as the current-density of the membrane (10) depends on the area-specific conductance. Area-specific conductance is specified in the units of S/cm² and is a measure of extent to which the protons are allowed by the membrane (10) to be conducted through itself per unit area of the membrane (10). For a reasonable performance, in an electrochemical device, the area-specific conductance of the membrane (10) should be at least 1 S/cm². Area-specific conductance can be increased by decreasing the thickness of the membrane (10) (the dimension of the membrane (10) in a direction parallel to the passage of ions through the membrane (10)) and hence the same is a property dependent on thickness of the membrane (10). A parameter that is independent of dimensions of the membrane (10) is 'ion-conductivity' specified in the units of S/cm. Though area-specific conductance can be increased by decreasing the thickness of the membrane (10), the mechanical properties such as the ultimate tensile-strength (UTS) may be compromised by decreasing the thickness. Therefore, thickness of the membrane (10) may not be normally decreased indiscriminately to enhance the area-specific conductance.

When a membrane (10) allows the passage of the undesirable chemical species such as, for example, the vanadium-ions in the example of vanadium redox flow battery, through itself, the flow-battery loses its energy-storage capacity. This is called the capacity-fade of the flow-battery. The capacity-fade can be prevented by preventing the flow of undesirable ions through the membrane (10). Permeability is a parameter that quantifies the passage of the undesirable chemical species through the membrane (10). The unit of permeability is cm²/minute. A parameter that takes into account both the ion-conductivity and permeability is selectivity. Selectivity is defined as the ratio of 'ionic-conductivity to permeability and the same is specified in the units of S×minute/cm³.

Typical values of selectivity of commonly used commercial membranes (10) used in flow batteries are of the order of $10^5$ S×minute/cm³ at room temperatures even with an ion-conductivity as high as 0.1 S/cm. This is because, those membranes (10) allow an easy passage for undesirable chemical species and hence the permeability would be very high. Therefore, for a membrane (10) with an ion-conductivity of 0.1 S/cm that is used in a typical vanadium redox flow battery, the permeability of $V^{4+}$ ion, for example, would be $10^{-6}$ cm²/minute resulting in a selectivity of $1×10^5$ Sxminute/cm$^3$. By blocking the passage of undesirable chemical species more effectively, the selectivity of the membrane (10) can be increased. For example, if the permeability is decreased by an order of magnitude, the selectivity of the same membrane (10) can be increased in the same order of magnitude.

During operation in a flow-battery, the ion-conducting membrane (10) is normally flushed with a liquid-electrolyte. For example, in a vanadium redox flow-battery, the liquid-electrolyte may be a solution of a vanadium-salt in an acid. The acid may be sulphuric acid. Under such conditions, the membrane (10) undergoes dimensional changes. This dimensional change is known as swelling. The 40 swelling of the membrane (10) is modulated by the presence of PVDF or PVDF-HFP in the blend (12). By changing the mass percentage of PVDF or PVDF-HFP, the swelling of the membrane (10) can be controlled. Another advantage of blending with PVDF or PVDF-HFP is that the membrane (10) may be able to perform even in high concentrations of H$_2$SO$_4$ such as, for example, greater than 5 M. A combination of PVDF and PVDF-HFP may also have similar effect on swelling and performing at high H$_2$SO$_4$ concentrations.

PBI has an imidazole unit in it. The imidazole unit in the polymer backbone of PBI polymer acts both as an acid site as well as basic site, depending on its chemical environment. For example, when immersed in an acid medium such as H$_2$SO$_4$ or H$_3$PO$_4$, the PBI membrane (10) acts as a cation conducting membrane (10). This process is called the protonation of the membrane (10). When protonated, the PBI membrane (10) allows for repulsion of positively charged ions according to Donnan exclusion principle. When immersed in bases such as, for example, NaOH or KOH, the PBI acts as anionic host.

PVDF and PVDF-HFP are hydrophobic in nature. When blended with PBI, the hydrophobic nature of PVDF or PVDF-HFP allows for the imidazole rings to be preferentially complexed or protonated with the acid molecules. It is desirable to have as many active sites as possible in a membrane (10). Active-sites in an ion-conducting membrane (10) refers to the sites on the polymer chains that host the active ions. Excessive PVDF in the polymer blend (12), however, will reduce the total number of active sites or deteriorate the mechanical properties of the membrane (10). Therefore, the mass percentage of PVDF or PVDF-HFP is maintained to be less than 20%. In some embodiments, the additive (14) used in the ion-conducting membrane (10) to be used in a flow-battery includes graphene-oxide, functionalised graphene-oxide, or a combination thereof. Graphene-oxide and functionalised graphene-oxide have a layered structure. Functional groups of the functionalized graphene-oxide such as OH$^-$, NH$^-_2$ and COOH$^-$, are intercalated between the layers and form a weak bond with the layers.

In some embodiments, the ion-conducting membrane (10) may be used in HT-PEM fuel-cell. The HTPEM fuel-cell is a fuel-cell operating at high temperatures, for example, up to 250° C. with hydrogen (H$_2$) as fuel. The ion-conducting membrane (10) to be used in a HT-PEM fuel-cell has an objective of having a high ion-conductivity for protons and low permeability for hydrogen gas molecules. An ion-conducting membrane (10) used in a HT-PEM fuel-cell is desired to have high ion-conductivity for protons at high-temperatures, for example, temperatures up to 250° C. and high mechanical strength, for example, high ultimate-tensile-strength at those high temperatures. Since the area-specific conductance is inversely proportional to its thickness, the membrane (10) is also desired to have low permeability for H$_2$ molecules as H$_2$ cross-over leads to low open-circuit potential in the HT-PEM fuel-cell.

A HT-PEM fuel-cell membrane (10) is normally impregnated with HPO$_4$ acid for creating active-sites. The process of impregnating the membrane (10) with an acid is also known as 'acid-loading' or 'acid-uptake'. Active-sites in a HT-PEM fuel-cell membrane (10) refer to the sites on the polymer chains that host the protons (H$^+$ ions) and the free volume of acid trapped within the membrane (10). A membrane (10) with high acid loading will have high active sites. A high acid-loading also softens the membrane (10). The softening of the membrane (10) results in degradation of its mechanical properties. At high temperatures, degradation of mechanical properties of the membrane (10) becomes severe.

In some embodiments, the ion-conducting membrane (10) that can be used in a HT-PEM fuel-cell includes PVDF, PVDF-HFP, or a combination thereof along with PBI in the homogeneous blend (12). h-BN is one of the additives (14). The other additive (14) may be one or more of graphene-oxide and functionalized graphene-oxide.

h-BN has a multi-layered structure similar to graphene. h-BN consists of alternating boron (B) and nitrogen (N) atoms forming hexagonal rings. Protons can travel through the centers of hexagonal rings in the atomic-layers of h-BN while other large molecules are blocked. This structure makes membranes (10) containing h-BN impermeable to all chemical species other than protons. The centres of the hexagonal rings of BN in the successive atomic layers overlap with each other. Therefore, structure of h-BN may be conceived to be "porous" for proton. With a melting point, T$_m$, of greater than 2800° C., h-BN is thermally highly stable. Therefore, the membranes (10) containing h-BN may be operated at high temperatures due to its high thermal stability. The highly "porous" nature of h-BN for the conduction of protons allows for higher mass percentage of additive (14) in the membrane (10) and higher agglomeration quantity.

Due to the layered atomic structure of h-BN contained in the membrane (10), phosphoric acid molecules can be intercalated between the layers of h-BN. Due to increased interactions between the nano-additives (14) and the phosphoric acid molecules, less acid leaches away from the membrane (10).

In some embodiments, the ion-conducting membrane (10) that can be used in a HT-PEM fuel-cell, the mass percentage of the one or more polymers is in a range from 1% to 20%. The mass percentage of additives (14) is in a range of 1% to 20%. h-BN is in a higher quantity than the one or more other additives (14). In some embodiments, the mass of h-BN is equal to or greater than 10 times the mass of the one or more other additives (14). The dispersion quantity is more than 90% and agglomeration quantity is less than 30%. Area-specific conductance greater than 1 S/cm$^2$ at a temperature of 30° C. and up to 60 S/cm$^2$ at a temperature of 200° C.

Electrolysers generate hydrogen (H$_2$) gas and (O$_2$) gas from water (H$_2$O). Electrolysers that use a membrane (10) to generate H$_2$ may use either a cation exchange membrane (10) or an anion exchange membrane (10). Electrolysers using anion-exchange-membrane (10) (AEM) are known as AEM electrolysers. The electrolytes used in AEM electrolysers are hydroxides. Such hydroxide solutions are also known as alkalis. Alkalis include sodium hydroxide (NaOH) and potassium hydroxide (KOH). The performance of such electrolysers depends on the concentration of the alkali solution used. The efficiency of electrolysers increases with increasing alkali concentration. The concentration of alkalis normally used in electrolysers is in the range 5% to 40%, the percentages being expressed in the ratio of mass of the alkali to volume of water. The main limitation of AEM is the degradation of membrane (10) in high alkali concentrations.

The membranes (10) used in AEMs are usually made of polymers functionalized with quaternary amine groups. The quaternization reactions leads to the functionalization of the polymer to create ionogenic sites to enable operation in an alkali medium. An alkali solution of high concentration attacks the —NH$_2$ group of the anion exchange membrane (10) through Hoffman elimination. Hoffman degradation involves the removal of a —C═O group from the polymer backbone in the presence of a strong base.

Membranes (10) of PBI polymer can operate in high alkali concentration solutions. However, high alkali concentration solutions soften the PBI polymer. Functionalized-GO additive (14) is dispersed in the membrane (10) to improve the mechanical strength via structural reinforcements. The functionalized-GO is functionalised in a way as to create additional active sites and pathways for hosting 30 and transporting OH$^-$ groups within the membrane (10). The active OH$^-$ sites present in GO are also prone to Hoffman degradation. The ability of PBI to host higher concentration of alkali solutions diverts the Hoffman degradation of functionalized-GO.

The ion-conducting membrane (10) disclosed herein may be used in an AEM electrolyser. In the ion-conducting membrane (10), the functionalized-GO additive (14) is dispersed to maximise number of active sites and mechanical resilience of the membrane (10). The mass percentage of functionalised-GO is selected to be in the range from 1% to 80%. In the ion-conducting membrane (10), chitosan, functionalized-chitosan or their combination are used along with PBI to make the homogeneous polymer blend (12). Chitosan or functionalised-chitosan reinforces the PBI functionalised-GO matrix by means of a continuous network of hydrogen bonds. It acts as a bridge between the nanosheets of GO and the PBI polymer matrix in aqueous solution, leading to better dispersion of the sites and additives (14) within the membrane (10). Mass percentage of chitosan or functionalised-chitosan or a combination thereof is in the range from 1% to 40% in the polymer blend (12).

In a DMFC, normally dilute methanol in liquid form is used as a fuel, unlike in conventional hydrogen fuel-cells. The methanol is diluted with H$_2$O. The concentrations of methanol in water used in generally known DMFCs are usually in a range from 1 M to 3 M. Therefore, the energy-densities of DMFCs are very low. High concentrations of methanol cannot be used in a DMFC because of the cross-over of the methanol molecules through the membrane (10). A membrane (10) that can prevent the passage of methanol molecules through itself allows for using a methanol-fuel of higher concentration in a DMFC. In a membrane (10) with a low enough methanol permeability, methanol concentrations in the fuel-feed can be as high as 15 M. Therefore, a membrane (10) to be used in a DMFC should have a high ion-conductivity for protons and very low permeability for methanol molecules. Methanol molecules are larger than protons in size. Crossover of methanol through the membrane (10) can be prevented by creating impediment to the flow of methanol through the membrane (10). One objective of this disclosure is to form a membrane (10) that offers a high resistance to the flow of methanol while preferentially offering pathways that offer minimal resistance to the flow of protons.

In some embodiments, the ion-conducting membrane (10) disclosed herein is suitable for use in DMFC. The ingredients, compositions, and the process for forming the ion-conducting membrane (10) suitable for use in a DMFC are selected. The ion-conducting membrane (10) disclosed herein, is also suitable for use in DMFC operating at temperatures up to 230° C. PVDF, PVDF-HFP, or their combination is blended with PBI and dispersed with one or more additives (14) selected from the group consisting of h-BN, GO, and functionalised-GO, to enhance the thermal stability, ion conductivity, and mechanical property. This leads to improved performance of DMFC at high temperatures. High temperature operation allows for operating the DMFC with or without a reformer. The DFMC operating at high temperatures provides for higher efficiencies.

Herein, the membrane (10) includes another polymer along with PBI. PVDF, PVDF-HFP or a combination of PVDF and PVDF-HFP may be used as the other polymer as a part of the homogeneous polymer blend (12). The mass percentage of PVDF. PVDF-HFP, or a combination thereof is in a range from 1% to 35%. The membrane (10) comprises one or more additives (14) selected from the group consisting of GO, functionalized-GO, and h-BN. Addition of h-BN allows for high-temperature operation. The mass percentage of the one or more additives (14) is in a range from 1% to 80%. The membrane (10) has a dispersion quantity greater than 90% and agglomeration quantity less than 20%. The area-specific conductance of the membrane (10) is greater than 1 S/cm$^2$. The ultimate tensile strength of the membrane (10) is greater than 50 MPa.

Figures 2A, 2B, 2C:
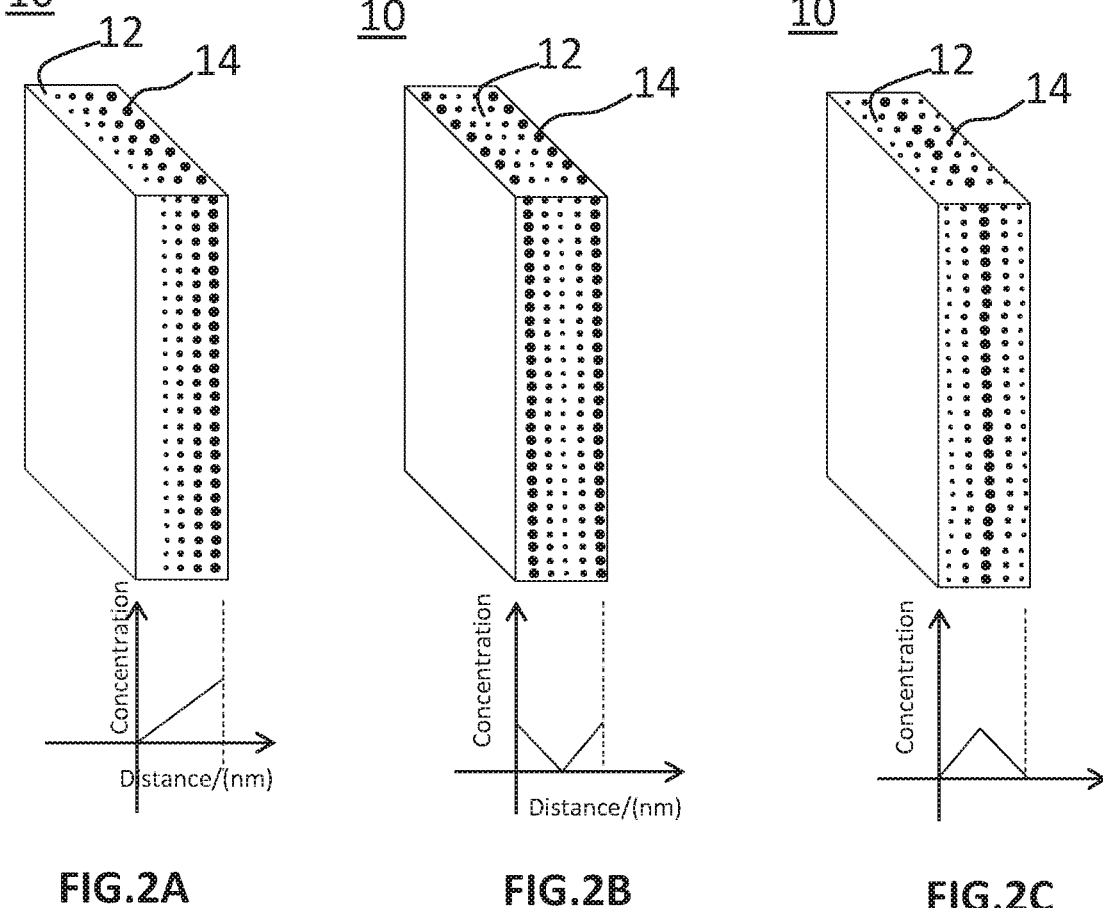
FIG. 2A illustrates a membrane (10) with a linear gradient in additive (14) dispersion, in accordance with one embodiment of the present disclosure.
FIG. 2B illustrates a membrane (10) with a non-linear gradient in additive (14) dispersion, in accordance with one embodiment of the present disclosure.
FIG. 2C illustrates a membrane (10) with another non-linear gradient in additive (14) dispersion, in accordance with one embodiment of the present disclosure.

In order to achieve low permeability for methanol molecules, while retaining the high area-specific conductance, the ion-conducting membrane (10) is formed to have a gradient along the direction of the flow of methanol molecules. The gradient may include gradient in dispersion, or chemical composition. Different possible gradients in dispersion of the one or more additives (14) in the polymer blend (12) are shown in FIGS. 2A, 2B and 2C. FIG. 2A shows a dispersion continuously varying along the thickness of the membrane (10). FIG. 2B and FIG. 2C show the dispersions varying along the thickness of the membrane (10) to have a dip and a peak respectively, in the dispersion profile along the thickness of the membrane (10). The gradients were achieved by forming several sub-membranes (10) of different compositions and integrating them to form a monolithic membrane (10). In some embodiments, the ion-conducting membrane (10) comprises of several sub-membranes (10) of smaller and varying thickness to achieve a gradient in conductivity and a gradient in methanol permeability. The membrane (10) forming process is so designed as to integrate the sub-membranes (10) to form a single monolithic membrane (10) during the process of forming the ion-conducting membrane (10). The ingredients, composition, dispersion quantity and agglomeration quantity of each sub-membrane (10) are varied to achieve the desired gradients.

The physical structures of some of the components of electrochemical devices can be as simple as an ion-conducting membrane (10) used in a flow-battery to as complex as a membrane (10)-electrode assembly (MEA) or catalyst coated membrane (10) (CCM) used in a fuel-cell. The physical structures of the components in some electrochemical devices such as advanced metal batteries can be far more complicated as those in fuel-cells. The challenges are invariably associated with the nature of active chemical species, and the components that handle those active chemical species.

In advanced metal batteries, the use of lithium-metal as anode achieves higher energy density than conventional lithium-ion batteries. In lithium metal batteries, lithium-metal is used as an anode instead of graphite that is inter-calated with lithium-ion. In an advanced lithium metal battery, sulphur is used as one of the components of the cathode. Sulphur is not an intercalation compound like graphite. The other components used in advanced metal batteries are often chosen from the conventional technologies due to lack of availability of compatible components. For example, lithium-sulphur batteries still use liquid electrolytes with a separator. The sulphur that is used as the cathode has a tendency to form polysulphides such as $Li_2S$, $Li_2S_2$, $Li_2S_3$, $Li_2S_4$, $Li_2S_6$, $Li_2S_8$, and $S_8$. These polysulphides are actually part of the active material of the battery. When the active material is transferred to the electrolyte, the capacity of the battery reduces resulting in capacity-fade. Formation of lithium metal dendrites that may lead to piercing of the separator is another serious challenge in lithium-sulfur batteries.

Electrochemical devices such as aluminum-air batteries, which are also known as aluminum-air fuel-cells, have a serious challenge of corrosion of aluminum electrode. Some other electrochemical devices such as the ones used for extracting lithium metal from a brine solution use solid-electrolytes. The solid electrolytes exposed to highly corrosive brine environment are prone to accelerated degradation. The components (100) disclosed herein are designed to address the above mentioned challenges, associated with one or more electrochemical devices.

Some of the components (100) disclosed herein necessarily contain a membrane (10), and one or more type of physical structures. The physical structure may include a layer of nanofiber (22), an electrode, a solid electrolyte, or interfacial layers used in conjunction with the membrane (10). The ingredients, compositions, and forming process of the membranes (10) and physical structures in different embodiments may vary depending on the application.

In certain embodiments, a component (100) containing a membrane (10), wherein the membrane (10) is abutted on opposing sides by a layer of nanofiber (22)s is disclosed. The abutment of the layers of nanofiber (22)s maybe integrated with largest surfaces of the membranes (10) oriented in a direction perpendicular to the flow of ions/molecules through the membrane (10).

In certain embodiments, a component (100) in which a layer of nanofiber (22) is abutted on opposing sides by two membranes (10) is disclosed. The abutment occurs on the largest surface sides of the membranes (10) that are usually also perpendicular to the flow of ions/molecules through the membrane (10).

In certain other embodiments, a component (100) in which a membrane (10) is abutted on one side by an electrode of a device and on the opposing side the membrane (10) is abutted by a layer of nanofibers (20) is disclosed. The abutment occurs on the largest surface sides of the membranes (10) that are perpendicular to the flow of ions/molecules through the membrane (10). One such embodiment is illustrated in FIG. 3C.

The membrane (10) described in nearly all the above embodiments comprises a homogenous blend (12) of PBI with one or more polymers selected from the group consisting of PVDF, PVDF-HFP, chitosan, and functionalised chitosan. The mass-percentage of the one or more polymers is in a range from 1% to 40%. One or more additives (14) selected from the group consisting of graphene-oxide, functionalised graphene-oxide, and h-BN are used. The mass percentage of the one or more additives (14) is in the range from 0.5% to 80%. The additives (14) are dispersed in the polymer blend (12) with a dispersion quantity of greater than 80% and agglomeration quantity less than 30%. An area-specific ion-conductance of the membrane (10) is greater than 1 $S/cm^2$ at 30° C.

Figures 3A, 3B:
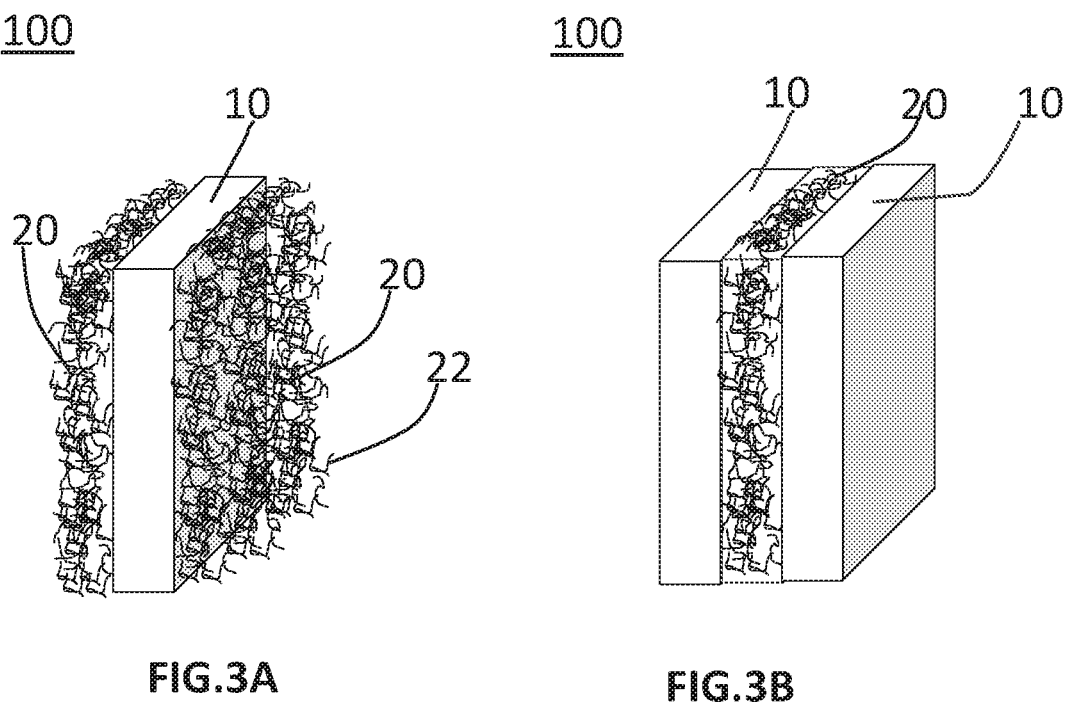
FIG. 3A illustrates a membrane (10) integrated with two nano/micro fibre layers, in accordance with one embodiment of the present disclosure.
FIG. 3B illustrates a membrane (10) that embeds a nano/micro fibre layer, in accordance with 15 one embodiment of the present disclosure.
Figure 3C:
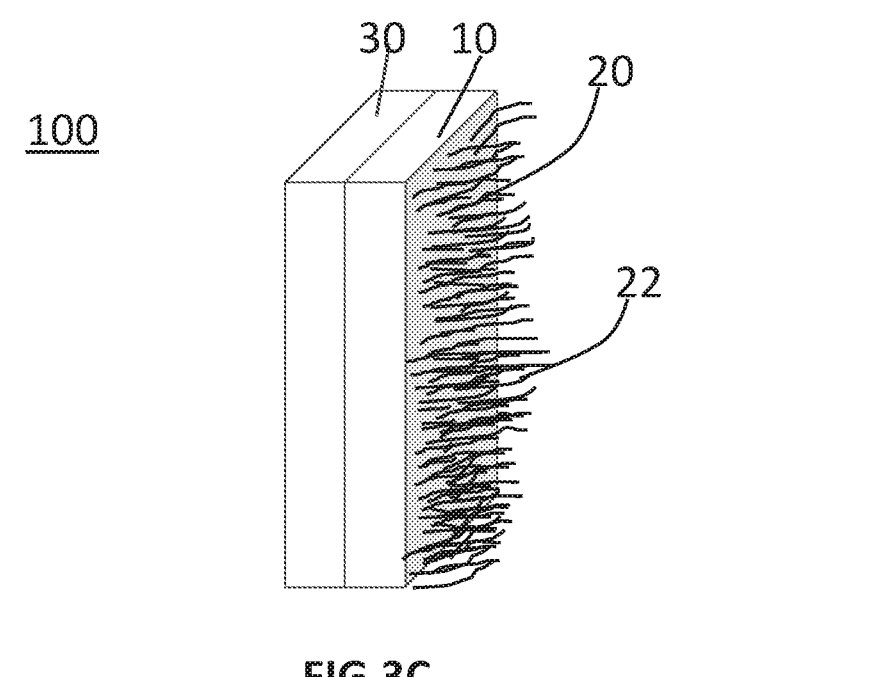
FIG. 3C illustrates a membrane (10) with an integrated nano/micro fibre layer, bonded to an electrode, in accordance with one embodiment of the present disclosure.

FIG. 3A illustrates a component (100) with an ion-conducting membrane (10) and two nanofiber layers (20). The membrane (10) acts as a thin dense interlayer sandwiched between two porous nanofiber layers (20). This kind of physical structure of the component may be advantageous with metal-electrode flow-batteries where nanofibers (22) on the outer side can soak up more electrolyte as the nanofibers (22) enable ions to have more accessible paths for conduction. The dense interlayer acts as a barrier for the non-active ions. When stacks are manufactured, there is need for the membranes (10) to be able to withstand compressive forces, so that they do not undergo rupture and develop through-plane pinhole defects. The outer porous nanofiber layer (20) can tolerate compressive forces and prevent the inner dense interlayer from being directly pierced. The component (100) shown in FIG. 3A may be used in electrochemical devices including electrolysers, advanced metal batteries and flow batteries.

The process of forming the component (100) involves the following steps. In the first step, a pre-formed solution of a first viscosity, containing a homogenous polymer solution and an additive (14) dispersion is prepared. In the second step, a porous standalone nanofiber layer (20) is formed by electro-spinning the preformed solution of first viscosity. In the third step, the solvent in the porous nanofiber layer (20) is partially removed. In the fourth step, another pre-formed solution of a second-viscosity appropriate for spray coating is prepared. In the fifth step, the preformed solution of the second viscosity is sprayed on one surface of the nanofiber layer (20). This forms a thin dense sheet of polymer additive (14) blend (12) on the nanofiber layer (20). In the sixth step, the solvent is partially removed from the thin dense sheet. In the seventh step, the preformed solution of the first viscosity is electro spun on the formed thin dense sheet. Finally, all the residual solvent is removed from the physical structure to form the desired component.

Depending on the application, the ingredients and the compositions of the preformed solutions may be tuned to form structures that are asymmetric about a plane passing through the center of the membrane (10). The plane of symmetry referred to herein is co-planar with the largest-area surface of the membrane (10). The ion conducting properties of the membrane (10) and the nanofiber layer (20)s can be tuned by changing the ingredients and composition of the preformed solutions.

FIG. 3B illustrates one example of a component (100) having two ion-conducting membranes (10) and a porous nanofiber layer (20). The nanofiber layer (20) is sandwiched on either sides by the two dense ion-conducting membranes (10). This kind of membrane (10) arrangement may be useful in high-temperature fuel-cells, alkaline fuel-cells, alkaline-electrolysers where the retention of ionic conductivity is a key requirement. The porous core (20) acts as host for the electrolyte (acidic or basic media), thereby increasing the area-specific conductance by trapping more strong acid or bases within it. Since fibers are stronger than films, high acid or base loading can be achieved with fibers. The fibers in turn are trapped by dense layers which serve a dual role of holding more acid or base inside the membrane (10) and serving as an external permeation barrier. The dense outer layers reduce the leaching of electrolyte thereby allowing more stable performance over long durations of time.

The process for forming the component (100) shown in FIG. 3B involves the following steps. In the first step, pre-formed solutions of different first, second, and third viscosities are prepared as described above. In the second step, a porous standalone nanofiber layer (20) is formed by electro-spinning the preformed solution of first viscosity. In the third step, the solvent in the porous nanofiber layer (20) is partially removed. In the fourth step, the preformed solution of second-viscosity appropriate for spray-coating is sprayed on to the nanofiber layer (20). In the fifth step the solvents are partially removed. In the sixth step, the pre-formed solution of the third viscosity is sprayed onto the other surface of the nanofiber layer (20), to form a second sheet. In the seventh step, the residual solvent is removed to form the desired component.

In some embodiments, the technique of forming the sheets in steps four and six maybe replaced with another sheet-forming technique such as dip coating. In some other embodiments, the technique of forming the sheets in steps four and six maybe replaced with another sheet forming technique such as solution casting. Depending on the application, the ingredients and the compositions of the pre-formed solutions can be tuned to form structures that are asymmetric about a plane passing through the center of the porous layer. The ion-conducting properties of the membrane (10) and the nanofiber layer (20)s can be tuned by changing the ingredients and composition of the preformed solutions.

FIG. 3C illustrates a component (100) in which a membrane (10) abutted on one side by an electrode (30) of a device and on the opposing side by a layer of nanofibers (20) is disclosed. The abutment occurs on the largest surface sides of the membranes (10) that are perpendicular to the flow of ions/molecules through the membrane (10). The components may have high conductivity for ions including proton, lithium-ion, aluminum-ion. The component may have low permeability for chemical species including poly-sulfides, ions of metal other than lithium, say, sodium ion (Na$^+$), hydroxide ions (OH$^-$), and magnesium ion.

The process for forming the component (100) shown in FIG. 3C involves the following steps. In the first step, pre-formed solutions of first and second viscosity are prepared as described above. In the second step, the solution of first viscosity is sprayed directly onto a substrate to form a sheet. The substrate (30) may include electrode, solid electrolyte, and other interfacial layers of the electrochemical devices. In the third step, the solvents in the sheet are partially removed. In the fourth step, the preformed solution of second viscosity is electro spun onto the surface of the sheet in order to form a nanofiber layer (20). In the last step, the residual solvent is completely removed. In some embodiments, the sheet is formed on the selected substrate by solution casting technique or dip coating.

Figure 4A:
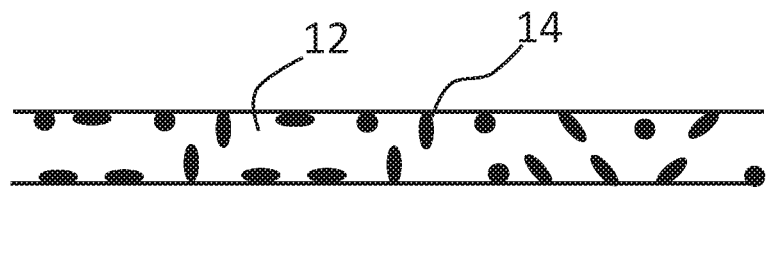
FIG. 4A illustrates an arrangement of additives (14) of different length-scales in the membrane (10), in accordance with one embodiment of the present disclosure.
Figure 4B:
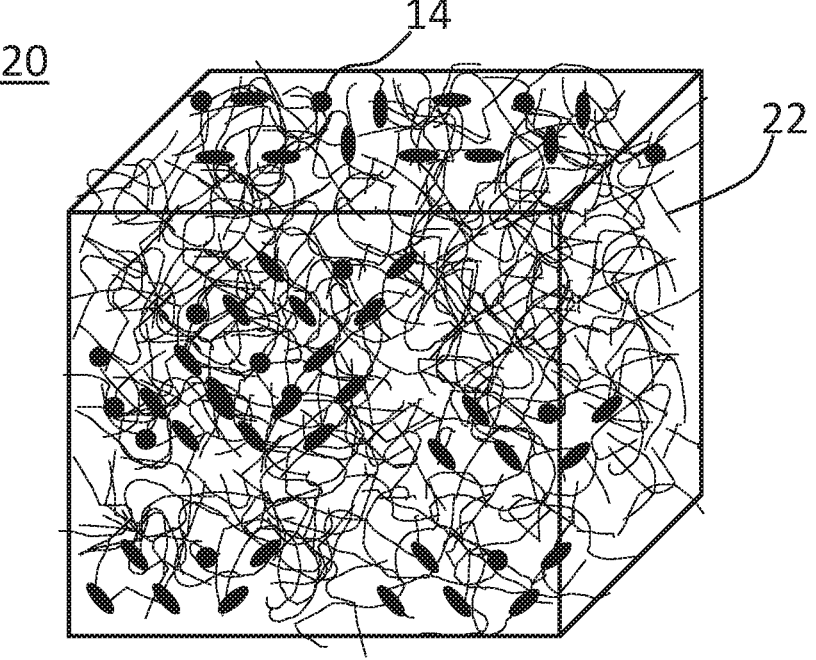
FIG. 4B illustrates a nanofibrous porous mat (20) having nano additives (14), in accordance with one embodiment of the present disclosure.

According to various embodiments of this disclosure, additives (14) of different length-scales can be incorporated into the polymer blend (12) in any suitable shape or size as illustrated in FIG. 4A. A nanofiber mat (20) as shown in FIG. 4B can also be prepared with a multitude of nanofibers (22) which can, in various embodiments, also include additives (14) in the matrix forming the nanofiber mat (20).

EXAMPLES

In one experiment, 9.6 g of PBI and 1.06 g of PVDF were dissolved in 61.79 g of DMAc in a glass-beaker on a hotplate equipped with a magnetic stirrer. The temperature was slowly increased from room temperature to 140° C. while simultaneously stirring over a period of 16 hours to form a homogeneous solution of polymers. In a parallel experiment, 0.19 g of graphene-oxide was dispersed in 7 g of DMAc by ultrasonicating followed by stirring at room temperature to form the additive-dispersion.

Further, the additive-dispersion was added to the homogeneous polymer-solution and mixed to form the pre-forming solution. The pre-forming solution was then cast on a glass-plate in to a sheet form using a doctor-blade technique. The sheet was heated to 150° C. to drive out the solvent and to form the membrane (10). The membrane (10) was then peeled off from the substrate using water.

The thickness of the membrane (10) as measured using a screw-gauge was 40 μm. The membrane (10) was further characterized for permeability, dispersion quantity, agglomeration quantity, and conductivity.

The permeability of the membrane (10) was measured as set forth in So-Won Choi, et. al. "Hydrocarbon membranes (10) with high selectivity and enhanced stability for vanadium redox flow battery applications: Comparative study with sulfonated poly(ether sulfone)s and sulfonated poly (thioether ether sulfone)s", Electrochimica Acta, vol. 259, pp. 427-439 (2018).

In brief, the membrane (10) with a thickness of 40 μm and a cross-sectional area of 1.847 cm$^2$ was mounted in a cell containing two compartments. One compartment contained a 35 ml solution of VOSO$_4$·5H$_2$O salt in 2 M H$_2$SO$_4$. The concentration of VOSO$_4$·5H$_2$O salt in 2 M H$_2$SO$_4$ solution was 1.66 M. Another compartment contained a 35 ml solution of MgSO$_4$ salt in 2 M H$_2$SO$_4$. The concentration of MgSO$_4$ salt in 2 M H$_2$SO$_4$ solution was 1.66 M. The membrane (10) was mounted between the two solutions in such a way as to allow the flow of ions from both compartments to each other. The solution containing MgSO$_4$ was continuously stirred for 48 hours. After 48 hours, the solution in the MgSO$_4$ compartment was analysed in a UV-Vis spectrophotometer for determining the concentration of V$^{4+}$ ions. The concentration of V$^{4+}$ ions was determined to be 0.00282 M. The permeability of the membrane (10) was determined to be 5.03×10$^{-8}$ cm$^2$/min.

A flow-cell was constructed for the measurement of ion-conductivity of the membrane (10) as set forth in M. Raja, et. al, "Binder-free thin graphite fiber mat sandwich electrode architectures for energy-efficient vanadium redox flow batteries". Catalysis Today, vol. 370, pp 181-188 (2021)

A square-shaped 40 μm thick membrane (10) of dimensions 7 cm×7 cm was used for the measurement of ion-conductivity. The effective area of the membrane (10) was 25 cm$^2$. The membrane (10) was pre-treated in 3 M H$_2$SO$_4$ for 2 hours prior to assembling the membrane (10) in the flow-cell. For the measurement, a 3 M H$_2$SO$_4$ was circulated through the flow-cell using a peristaltic pump. Electrochemical impedance spectrometry (EIS) measurement was conducted on the flow-cell in a frequency range of 200 kHz to 100 mHz. The real part of the membrane (10) impedance taken at zero imaginary impedance was taken to be membrane (10) resistance. The conductivity was calculated from the resistance value. In one measurement, the membrane (10) resistance was 63 mΩ. The area-specific conductance was calculated to be 635 mS/cm$^2$. The ion-conductivity was calculated to be 2.54 mS/cm. The selectivity was calculated to be 5.04×10$^4$ S×minute/cm$^3$.

Tensile testing of ion-conductivity of the membrane (10) was carried out as set forth in ASTM D882-18, Standard Test Method for Tensile Properties of Thin Plastic Sheeting, ASTM International, West Conshohocken, PA, (2018).

A clean and dry membrane (10) of thickness 40 μm was cut into strips of length 300 mm and width 6 mm. The gauge-length of the sample was 250 mm. The sample was fixed in the universal testing machine with a 100 N load-cell. Strain rate of 25 mm/minute was used during the uniaxial tensile test as recommended by the standard. Ultimate tensile strength (UTS) was calculated by taking the maximum load obtained from the tensile test. In one measurement, UTS was calculated to be 42 MPa.

The presently disclosed ion-conducting membranes (10) and associated devices incorporating these membranes (10) can provide enhanced ion-conductivity of desired ions while also inhibiting transport of undesired chemical moieties. Through the selection of additives (14) to the polymer blend (12) a membrane (10) can be designed with the desired transport properties for its application in an electrochemical system. For applications in devices having either acidic or basic operating conditions, both the polymer blend (12) and the additives (14) can be selected and adjusted to achieve either anion or cation transport.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

We claim:

1. An ion-conducting membrane comprising:
(a) a homogenous blend of PBI with one or more polymers selected from the group consisting of chitosan and functionalized-chitosan, wherein a mass-percentage of the one or more polymers is in a range from 1% to 40%; and
(b) one or more additives selected from the group consisting of graphene-oxide and functionalised graphene-oxide, wherein the mass percentage of the one or more additives is in a range from 0.5% to 80%,
wherein the additives are dispersed in the homogenous blend with a dispersion quantity greater than 80% and agglomeration quantity less than 30%, and an area-specific ion-conductance of the ion-conducting membrane is greater than 1 S/cm$^2$ at 30° C.

2. The ion-conducting membrane according to claim 1, comprising the one or more polymers selected from the group consisting of chitosan and functionalised-chitosan, wherein a mass-percentage of the one or more polymers is in a range from 2% to 40%; and the one or more additives comprising functionalised graphene-oxide, wherein a mass percentage of the one or more additives is in a range from 1% to 80%,
wherein a dispersion quantity of the one or more additives is greater than 90% and the agglomeration quantity of the one or more additives is less than 10%; and
wherein an area-specific ion-conductance of the membrane is greater than 1 S/cm$^2$ at 30° C. and an ultimate tensile strength greater than 50 MPa.

3. A component comprising an ion-conducting membrane, the ion-conducting membrane comprising:
(a) a homogenous blend of PBI with one or more polymers selected from the group consisting of chitosan and functionalized-chitosan, wherein a mass-percentage of the one or more polymers is in a range from 1% to 40%; and
(b) one or more additives selected from the group consisting of graphene-oxide and functionalised graphene-oxide, wherein the mass percentage of the one or more additives is in a range from 0.5% to 80%,
wherein the additives are dispersed in the homogenous blend with a dispersion quantity greater than 80% and agglomeration quantity less than 30%, and an area-specific ion-conductance of the ion-conducting membrane is greater than 1 S/cm$^2$ at 30° C.

4. The component according to claim 3, wherein the ion-conducting membrane is abutted on two opposing sides by a layer of nanofibers each in a direction perpendicular to a flow of ions through the ion-conducting membrane.

5. The component according to claim 3, wherein one ion-conducting membrane abuts a layer of nanofibers on one side of the layer, and another ion-conducting membrane abuts the layer of nanofibers on the opposing side, in a direction perpendicular to a flow of ions through the ion-conducting membrane.

6. The component according to claim 3, wherein an ion-conducting membrane is abutted on one side by a substrate, and on the opposing side by a layer of nanofibers, in a direction perpendicular to a flow of ions through the ion-conducting membrane.

7. A process for making an ion-conducting membrane comprising:
dissolving a PBI polymer and one or more polymers selected from the group consisting of chitosan and functionalized-chitosan in one or more solvents selected from the group consisting of DMAc, DMF, DMSO, NMP, THF, phosphoric acid, poly-phosphoric acid, formic acid, KOH, and ethanol, to form a homogenous polymer-solution, wherein a mass percentage of the selected one or more polymers is in a range from 1% to 40%;
dispersing one or more additives selected from the group consisting of graphene-oxide and functionalised graphene-oxide in the one or more solvents, to form an additive-dispersion, wherein the mass percentage of the one or more additives is in the range from 0.5% to 80%;
homogenously mixing the polymer-solution and the additive-dispersion to obtain a pre-forming solution;
forming a sheet, and
removing the solvent to obtain the ion-conducting membrane,
wherein the additives are dispersed in the ion-conducting membrane with a dispersion quantity of greater than 80%, an agglomeration quantity less than 30%, and the area-specific ion-conductance of the membrane is greater than 1 S/cm$^2$ at 30° C.

8. The process for making the membrane according to claim 7, wherein the process further comprises:

selecting the chitosan, functionalised chitosan, or a combination thereof, wherein the mass percentage of chitosan, functionalised-chitosan or a combination thereof is in a range from 2% to 40%;

dissolving the selected polymer and PBI in one or more solvents selected from the group consisting of DMAc, DMF, DMSO, NMP, THF, phosphoric acid, poly-phosphoric acid, formic acid, KOH, and ethanol to form the homogenous polymer-solution, wherein the mass ratio of solid to liquid content in the polymer-solution is up to 0.2;

selecting the one or more additives comprising functionalised graphene-oxide, wherein a mass percentage of the one or more additives is in a range from 1% to 80%;

dispersing the one or more additives in the one or more solvents to form the additive-dispersion;

mixing the homogeneous polymer-solution and additive-dispersion by stirring and ultrasonicating to form the pre-forming solution;

solution-casting the pre-forming solution to form a sheet; and removing the one or more solvents.

9. A process for making a component comprising an ion-conducting membrane, the process comprises:

dissolving a PBI polymer and one or more polymers selected from the group consisting of chitosan and functionalized-chitosan in one or more solvents selected from the group consisting of DMAc, DMF, DMSO, NMP, THF, phosphoric acid, poly-phosphoric acid, formic acid, KOH, and ethanol, to form a homogenous polymer-solution, wherein a mass percentage of the selected one or more polymers is in a range from 1% to 40%;

dispersing one or more additives selected from the group consisting of graphene-oxide and functionalised graphene-oxide in the one or more solvents, to form an additive-dispersion, wherein the mass percentage of the one or more additives is in the range from 0.5% to 80%;

homogenously mixing the polymer-solution and the additive-dispersion to obtain a pre-forming solution;

forming a sheet from the pre-forming solution, and removing the solvent from the sheet to obtain the ion-conducting membrane, wherein the additives are dispersed with a dispersion quantity of greater than 80%, an agglomeration quantity less than 30%, and the area-specific ion-conductance of the membrane is greater than 1 S/cm$^2$ at 30° C.

10. The process for forming the component according to claim 9, wherein the process further comprises:

controlling the viscosity of the pre-forming solution by independently varying the ratio of polymer to solvent in the polymer-solution and the ratio of additive to solvent in the additive-dispersion, wherein a viscosity of the pre-forming solution is in a range of 20 centipoise to 3000 centipoise.

11. The process for forming the component according to claim 10, wherein the process further comprises:

electro-spinning the pre-formed solution of a first viscosity to form one stand-alone layer of nanofibers;

spraying the pre-formed solution of a second viscosity onto the stand-alone layer of nanofibers to form the sheet; and electro-spinning the pre-formed solution of the first viscosity on to the surface of the sheet opposite to the stand-alone layer of nanofibers, to form a second layer of nanofibers, wherein removing the solvent comprises partially removing the solvents after each step of forming the individual layers of the component and completely removing the solvent after the formation of the component is complete, and wherein the component comprises an ion-conducting membrane abutted on its largest surface area side by two layers of nanofibers each layer located on one of the two opposing sides of the ion-conducting membrane.

12. The process for forming the component according to claim 10, wherein the process further comprises:

electrospinning the pre-formed solution of a first viscosity to form a layer of nanofibers and partially removing the solvents;

spraying or dip-coating the pre-formed solution of a second viscosity on to a surface having largest surface area of the layer of nanofibers and partially removing the solvents;

repeating the spraying or dip coating step onto the opposite surface of the layer of nanofibers; and completely removing the solvents, wherein the component comprises two ion-conducting membranes abutting a layer of nanofibers.

13. The process for forming the component according to claim 10, wherein the process further comprises:

spraying or dip-coating the pre-formed solution of a first viscosity on to the surface of a substrate to form a sheet of ion-conducting membrane;

electrospinning the pre-formed solution of a second viscosity' to form the layer of nanofibers on the surface of the sheet; and removing the solvent, wherein removing the solvent comprises partially removing the solvents after each step of forming the individual layers of the component and completely removing the solvent after the formation of the component is complete, and wherein the ion-conducting membrane abuts the substrate on its largest surface on one side and a layer of nanofibers on the opposite surface.

14. A manufactured article comprising an ion-conducting membrane according to claim 1.

15. The manufactured article according to claim 14, wherein the manufactured article comprises a redox flow battery, a high temperature proton exchange membrane, an electrolyser, a direct vapor fuel cell, a direct methanol fuel cell, a high temperature direct vapor fuel cell, a high temperature direct methanol fuel cell, a metal-alkali earth battery, a fuel cell, a battery, or an electrochemical system.

* * * * *